(12) United States Patent
Beaudouin

(10) Patent No.: US 12,416,823 B2
(45) Date of Patent: Sep. 16, 2025

(54) ACOUSTO-OPTIC MODULATOR

(71) Applicant: B612 GmbH, Hergiswil (CH)

(72) Inventor: Jean-Michel Beaudouin, Hergiswil (CH)

(73) Assignee: B612 GmbH, Hergiswil (CH)

( * ) Notice: Subject to any disclaimer, the term of this patent is extended or adjusted under 35 U.S.C. 154(b) by 416 days.

(21) Appl. No.: 18/040,045

(22) PCT Filed: Jul. 12, 2021

(86) PCT No.: PCT/EP2021/069318
§ 371 (c)(1),
(2) Date: Jan. 31, 2023

(87) PCT Pub. No.: WO2022/023007
PCT Pub. Date: Feb. 3, 2022

(65) Prior Publication Data
US 2023/0273469 A1 Aug. 31, 2023

(30) Foreign Application Priority Data
Jul. 31, 2020 (EP) ..................................... 20188795

(51) Int. Cl.
*G02F 1/11* (2006.01)
(52) U.S. Cl.
CPC .................... *G02F 1/113* (2013.01)
(58) Field of Classification Search
CPC .................... G02F 1/11; G02F 1/113
See application file for complete search history.

(56) References Cited

U.S. PATENT DOCUMENTS

| 2007/0171513 | A1  | 7/2007 | Pannell et al. |
| 2009/0159149 | A1  | 6/2009 | Karayianni et al. |
| 2014/0070082 | A1* | 3/2014 | Guo ........................ G01N 21/59 |
|              |     |        | 250/227.14 |
| 2015/0160530 | A1* | 6/2015 | Han ........................ G02B 30/00 |
|              |     |        | 359/9 |

FOREIGN PATENT DOCUMENTS

| EP | 1 660 211 B1 | 7/2012 |
| EP | 2 562 595 A1 | 2/2013 |

(Continued)

OTHER PUBLICATIONS

S. Grishanov et al., "Doubly periodic textile patterns", J. Knot Theory and its Ramifications, 18 (2009), pp. 1-27. See Spc., p. 5.

(Continued)

*Primary Examiner* — Nathanael R Briggs
(74) *Attorney, Agent, or Firm* — Finch & Maloney PLLC

(57) ABSTRACT

An acousto-optic modulator (10) comprising a piezoelectric transducer (20) with a first electrode (21), a second electrode (22), and a dielectric material (23) disposed between and in contact with said electrodes (21, 22), and an acousto-optic element (30) comprising at least two further dielectric materials (31, 32) with mutually different refractive indices, wherein said piezoelectric transducer (20) and said acousto-optic element (30) are laminated together, and wherein at least one of said further dielectric materials (31, 32) of said acousto-optic element (30) is a dielectric textile having a doubly-periodic structure.

27 Claims, 4 Drawing Sheets

(56) References Cited

FOREIGN PATENT DOCUMENTS

Figure 1:
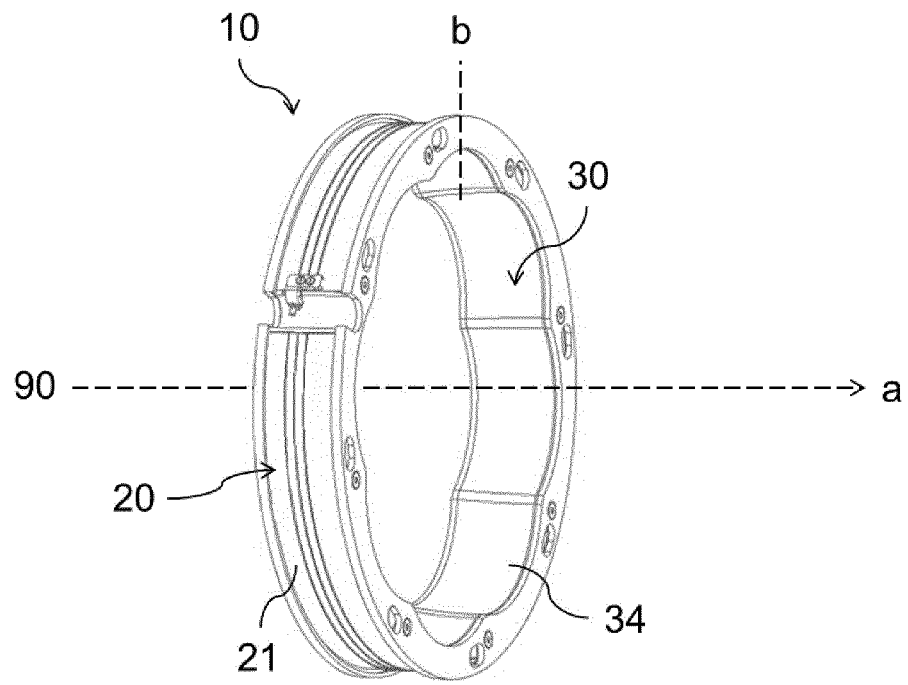

WO    2007/138341 A1    12/2007
WO    2012/028187 A1    3/2012

OTHER PUBLICATIONS

J. Gaudin et al., "Photoconductivity and photoemission studies of diamond irradiated by ultrashort VUV pulses", Applied Physics B, Lasers and Optics, 78, May 2004, pp. 1001-1004, See Sps., p. 11.
K Han et al., "Three-Dimensional Stimulated Emission Depletion Microscopy of Nitrogen-Vacancy Centers in Diamond Using Continuous-Wave Light", Nano Letters, vol. 9, No. 9, Jul. 27, 2009, pp. 3323-3329. See Spc., p. 11,
W. Zeng et al. "Fiber-Based Wearable Electronics: A review of Material, Fabrication, Devices, and Applications", Advanced Materials, vol. 26, No. 31, Aug. 1, 2014, pp. 5310-5536, See European Search See International Search.
European Search Corresponding to 20188795.7 mailed Jan. 26, 2021.
International Search Report Corresponding to PCT/EP2021/069318 mailed Sep. 30, 2021.
Written Opinion Corresponding to PCT/EP2021/069318 mailed Sep. 30, 2021.

* cited by examiner

ACOUSTO-OPTIC MODULATOR

The present invention relates to an acousto-optic modulator, an arrangement of an acousto-optic modulator and an electrode, a device for the treatment of a medium, and the use of both said acousto-optic modulator and said device for shortening light pulse duration and/or increasing the energy of photons, for the treatment of a medium, for the synthesis of organic molecules, for the production of hydrogen from water and/or hydrocarbons, or any combination thereof pursuant to the preamble of the independent claims.

Various acousto-optic modulators are known from the state of the art, e.g. from US 2007/0171513 A1, which discloses an acousto-optic modulator comprising a single crystal silicon acousto-optic interaction medium and at least one transducer for emitting an acoustic wave attached to the single crystal. However, such acousto-optic modulators usually have the disadvantage that their production requires structures which are patterned with sub-micrometer precision, e.g. single crystals, which are typically rather expensive and not easily available in large dimensions and/or different shapes. The brittleness or rigidity of crystalline structures also makes it difficult if not impossible to adapt these periodic structures to uneven or shaped substrates.

It is further known in from the state of the art to use electromagnetic radiation, in particular ultraviolet (UV) light, to sanitize air in a treated space. A system for purifying and removing contaminants from fluids working on this principle is known from EP 1 660 211 B1, for example. As the service life of the UV bulbs used in such devices is limited, frequent replacement of these UV bulbs may be necessary depending on application intensity and environmental conditions, which means a reduction of the service life and additional effort for the user.

Generally, a medium to be treated may be a gas, a liquid or a gaseous/liquid mixture which is subjected to plasma-generation. The plasma is conveyed into a treatment chamber in order to prolong the interaction duration between the plasma and the medium to be treated. However, the treatment duration and/or intensity in the device and in particular in the treatment chamber may not be sufficient to achieve a desired treatment result.

It is thus an object of the present invention to remedy these and other disadvantages of the state of the art and in particular to provide an acousto-optic modulator, an arrangement of an acousto-optic modulator and an electrode, and a device for the treatment of a medium that allows for an energy-efficient and effective treatment and which is also inexpensive and can be produced in a wide variety of shapes.

In the context of the present specification, the term gaseous medium refers to a gas or a gas mixture which may contain liquids and/or solids. Analogously, the term liquid medium refers to a liquid or a mixture of liquids which may contain gas and/or solid matter.

Although the invention is not limited thereby, the term treatment comprises the decomposition, synthesis, inactivation or fragmentation of molecules, including biological structures such as proteins, pollen, mold spores, bacteria, viruses and/or other microorganisms, entrained in the treated medium.

Further, the term plasma within the meaning of the present invention is understood as a gas and/or vapour that is dissociated into its component under the influence of an electrical field. The plasma comprises photons, ions, free electrons, free radicals and neutral particles, in particular excited neutral particles.

The object is achieved by an acousto-optic modulator, an arrangement of an acousto-optic modulator and an electrode, and a device for the treatment of a medium pursuant to the independent claims. Advantageous embodiments are subject of the dependent claims.

According to the present invention, the acousto-optic modulator comprises a piezoelectric transducer with a first electrode, a second electrode, and a dielectric material disposed between and in contact with said electrodes. In order to ensure contact between the dielectric material and the electrodes, the piezoelectric transducer may optionally comprise two contact elements configured to ensure contact between said first dielectric material and said electrodes. The piezoelectric transducer further comprises an acousto-optic medium with at least two further dielectric materials with mutually different refractive indices. The piezoelectric transducer and said acousto-optic medium are laminated together. The acousto-optic medium comprises at least one dielectric textile having a doubly-periodic structure.

It has now been surprisingly found that crystals in light modulation can be replaced by a textile featuring a regular structure, in particular by a knitted fabric of glass fiber or any other material with a high dielectric constant. This allows the realization of large acousto-optic structures with a size of several dozen square meters if desired or necessary. The flexibility of textiles also enables the realization of complex acousto-optic modulator shapes. Compared to the known conventional structures, which in addition are limited in size to a few square centimeters, material and manufacturing costs can be significantly reduced.

Piezoelectric transducers are known in the state of the art and constitute a type of electroacoustic transducer that converts the electrical charges produced by some forms of solid materials into energy. It is understood that the piezoelectric layer can generate acoustic waves, for example.

An acousto-optic modulator uses the acousto-optic effect to diffract and change the frequency of light by sound waves. Laser pulses force the piezoelectric cell to vibrate, creating sound waves in the glass. These can be imagined as expansion and compression planes, moving periodically, and changing the refractive index. The incoming light is scattered (Brillouin scattering) outside the periodic modulation of the resulting index, and interference occurs, similar to that created in a Bragg diffraction. The interaction can be thought of as a four-wave mixing of phonons and photons.

Without wishing to be bound by theory, it is presently assumed that the sequence of physical phenomena involved in subjecting an acousto-optic modulator as disclosed herein simultaneously to a static electric field and pulsed electromagnetic radiation can be qualitatively described as follows: 1) The absorption of a laser pulse by the semiconductor, i.e. the acousto-optic element, generates photo-excited free carriers; 2) These out-of-balance electrons and holes diffuse in the pre-existing static electric field; 3) The spatial separation of the charges generates a dynamic electric field between the electron clouds of the electrons and holes; 4) This dynamic field induces a mechanical constraint in the piezoelectric transducer via the piezoelectric effect which in turn is the source of the acoustic waves. The main difference between the piezoelectric material used herein and conventional piezoelectric transducers is that the electric field exerted on the material to generate the acoustic waves is triggered optically and not electrically, which makes it possible to considerably extend the working frequencies of the devices described herein to frequencies higher than GHz.

In the context of the present specification, the term doubly-periodic refers to the structure of a regular textile, which can be defined by a unit cell periodically repeating in two directions across the fabric (Grishanov et al., *J. Knot Theory and its Ramifications,* 18 (2009), 1597-1622). Knitted and woven textile structures are examples of doubly-periodic structures in a thickened plane made out of intertwining strands of yarn.

In a preferred embodiment, the acousto-optic modulator is part of a device for the treatment of a medium, preferably air.

In a preferred embodiment, the acousto-optic modulator disclosed herein comprises a piezoelectric transducer and an acousto-optic element. The piezoelectric transducer comprises a first electrode, a second electrode, and a dielectric material disposed between and in contact with said electrodes. Optionally, the piezoelectric transducer further comprises two contact elements which are configured for ensuring contact between said first dielectric material and said electrodes. The acousto-optic modulator comprises two further dielectric materials with mutually different refractive indices. Said piezoelectric transducer and said acousto-optic element are laminated together. One of said further dielectric materials of said acousto-optic element is a dielectric textile with a doubly-periodic structure.

Compared to the acousto-optic modulator described above, such an acousto-optic modulator in which the acousto-optic element is made of only two different dielectric materials, one of which is a textile with a doubly-periodic structure, is easier and cheaper to produce.

The electrodes of the acousto-optic modulator disclosed herein are used to apply a voltage to the dielectric material. Not wishing to be bound by theory, it is presently understood that excitation of the electrode surface by photons may enhance scattering of said photons by a mechanism known as surface-enhanced Raman scattering (SERS). This may also increase the variety of photons present in a treatment chamber as described in more detail below.

In a preferred embodiment of the acousto-optic modulator disclosed herein, the first and/or the second electrode material is selected from metal, activated carbon, graphene, and ionic polymers.

Such electrodes are readily available and can be manufactured in various shapes. The composition of the first and the second electrode material may also differ from each other.

Preferably, the first and/or the second electrode is aluminium.

Electrodes made from aluminium have the advantage that the electrodes are relatively inexpensive and ductile. In addition, aluminum foils and suitable aluminum sheets are generally readily available. Also, aluminium on the electret exaltates Raman scattering and luminescence.

Again, without wishing to be bound by theory, this phenomenon, which can reach a factor of 15, may be explained by an exaltation of the local electric field exerted on molecules and atoms. The origin of this exaltation is due to a coupling of laser light with the waves of electronic density which appear near the surface in certain metals having preferably submicron or even nanometer dimensions. The electron density waves are due to the free electrons of the metal. The new particles formed by this coupling are called surface plasmons. If the resonance frequency of these surface plasmons is in the visible range of the electromagnetic spectrum, the surface plasmons can be coupled to amplify the local electric field. The Surface Enhanced Raman Scattering (SERS) effect is therefore mainly the result of an increased electromagnetic field produced at the surface of the metal. When the wavelength of the incident light is close to the plasma wavelength of the metal, conduction electrons in the metal surface are excited into a delocalized electronic state corresponding to a surface plasmon resonance. The molecules adsorbed on or present near the surface feel a particularly strong electromagnetic field. In this context, the normal vibrational modes at the surface are the most strongly increased.

Preferably, the thickness of the aluminium foil is between 4 and 100 μm, more preferably between 4 and 20 μm.

By selecting the thickness of the aluminium foil as indicated, the vibrations in the transducer generated by an oscillating RF drive signal applied to the electrodes can be effectively transmitted to the adjacent acousto-optic medium. In particular, according to the invention, the use of household aluminium foil with a typical thickness between 10 and 15 μm is conceivable.

In the context of the present specification, the term thickness refers to the average thickness of the material of foil.

The acousto-optic modulator disclosed herein features a thermoelectret which is prepared by placing a dielectric material between two electrodes and maintaining said dielectric material or a mixture of dielectric materials at a suitable temperature for a prolonged period of time under the application of a hinged DC potential, followed by cooling the article to room temperature while maintaining the DC potential.

In the context of the present specification, the term electret is understood as a dielectric material layer with a (quasi)permanent electric charge, thus generating a (quasi) permanent electric field.

In a preferred embodiment of the acousto-optic modulator disclosed herein, the dielectric material of the piezoelectric transducer comprises at least one natural wax selected from the group consisting of carnauba, rosin, sugar cane, glycerol ester of wood rosin, lanolin, shellac, tallow, montan, ozocerite, spermaceti, beeswax, ouricury, Japan, bayberry, candelilla, Chinese, Chinese insect, and combinations thereof.

The listed dielectric materials have the advantage that as natural products they are particularly environmentally friendly. However, it is of course also conceivable and according to the invention that the dielectric material is composed of a synthetic polymer such as polyvinylidene difluoride (PVDF) resin, a polyvinyl chloride (PVC) resin, polycarbonate (PC), polyester, an acrylic resin, polyethylene (PE), polytetrafluoroethylene (PTFE), polypropylene (PP), polystyrene (PS), or copolymers and/or a mixture thereof.

Preferably, the dielectric material is selected from the group consisting of carnauba, rosin, beeswax and combinations thereof.

An electret manufactured from these materials can maintain its polarized state for a long period of time and features an excellent workability, toughness, and flexibility.

In a preferred embodiment of the acousto-optic modulator disclosed herein, the dielectric material of the piezoelectric transducer is selected from the group consisting of ZnO, $LiNbO_3$, $LiTaO_3$, $SiO_2$, quartz, $TiO_2$, Si, SiN, AlN, GaN, and $SrTiO_3$.

In a preferred embodiment of the acousto-optic modulator disclosed herein, at least one of the contact elements is a dielectric textile.

The use of textiles as a contact elements has the advantage that, due to its flexibility and stretch ability, the textiles can compensate particularly well for the shrinkage that occurs when the dielectric material cools down, thus ensuring an extensive contact between the respective electrodes and the dielectric material in-between.

Preferably, both contact elements are dielectric textiles. This way, an optimum connection between the dielectric material and the two electrodes sandwiching the dielectric material can be achieved.

Preferably, the dielectric textile used as contact element comprises a glass fiber knit. Glass fiber knits have the advantage that they are commercially available in a wide range of sizes and patterns, which can be chosen according to the specific application needs.

It has been shown that photonic crystals made of glass and silicon nitride can amplify fluorescence or luminescence several tens of times.

In a preferred embodiment, the acousto-optic modulator disclosed herein comprises a glass-fiber knit impregnated with a silicone resin.

Preferably, the silicone used to impregnate the glass-fiber knit is an optical silicone. Advantages of optical silicones include high thermal stability, optical clarity, UV-resistance, low shrinkage and good molding properties, which facilitates the production of acousto-optic elements or modulators with complex shapes.

Without wishing to be bound by theory, by filling the space between the meshes of a glass fiber knit with silicone resin a structure is obtained in which the chemical composition changes with position, similar to a quantum well heterostructure used in the semiconductor industry.

The periodic glass fiber structure impregnated with a silicon resin can also be regarded as a photonic crystal. A photonic crystal is a periodic dielectric structure that prohibits the propagation of photons at certain wavelengths. Similar to the electronic band gaps in semiconductors, photonic crystals feature photonic band gaps, i.e. a periodic variation of the dielectric constant which may be caused by inclusion of periodically spaced holes in the material, for example. This way, photonic band gaps prohibit the propagation of photons of certain energy. More precisely, a two-dimensional photonic band gap prevents the propagation of light for a certain frequency range and in all directions of the plane. Instead, it guides the emitted light towards the outside of the photonic crystal, improving the extraction efficiency.

In order to improve the control of the emission direction, the photonic crystals can also be placed on some kinds of mirrors, called Brag reflectors. These mirrors then reflect the light emitted by the photoemissive material back to the outside.

In a preferred embodiment, the silicone resin used to fill the voids in the glass fiber knit comprises at least one type of Raman-scattering crystals, preferably selected from the group consisting of diamond, corundum and/or quartz.

Without wishing to be bound by theory, it is presently assumed that electromagnetic radiation, i.e. photons, is dispersed more efficiently by these scattering particles thus increasing the treatment effect caused by said electromagnetic radiation. In particular, Raman, i.e. inelastic, scattering of photons on the crystals supports the amplification of the number of photons and leads to an increase of the energy, i.e. frequency, of at least a fraction of the scattered photons. The use of the specified Raman-scattering crystals is particularly preferred as these materials are readily available and comparatively inexpensive.

In particular with regard to diamonds, it is known that it is possible to excite primary and secondary electron-hole pairs in diamonds with photons (Gaudin et al., *Appl Phys B* 78 (2004), 1001-1004). Although the invention is not limited thereby, it is currently understood that primary and secondary electron-hole pairs are excited in the diamond coating which then recombine by emitting two photons thus amplifying the number of photons incident on the acousto-optic element described herein.

As an alternative to natural diamonds, zirconium oxide and/or other synthetic diamonds can be used. Preferably, a diamond coating with a nitrogen dopant is used.

It is known in the art that doping diamond with nitrogen creates so-called charged nitrogen-vacancy color centers which are excitable by visible light and subsequently generates luminescence (Han et al., *Nano Letters* 9 (2009), 3323-3329). Although the invention is not limited thereby, it is currently understood that this leads to a more efficient dispersion of the photons in the plasma.

Preferably, the content of said Raman-scattering crystals in the silicone is between 0.1 and 2 percent by weight of said silicone resin. In addition or alternatively, the size of said Raman-scattering crystals is between 4 and 1000 nm, preferably between 8 and 170 nm.

Compositions as well as particles with the above specifications allow for the production of a particularly effective acousto-optic modulator.

Mirrors can be used as active optical elements to focus ultra-short light pulses on a target. Provided this light has a sufficiently high intensity, the latter is strongly ionized by the intense electromagnetic field in a very short time, during the rising edge of the pulse.

In a preferred embodiment of the acousto-optic modulator disclosed herein, the surface of the acousto-optic medium is configured to form a plasma mirror comprising $SiO_2$ and/or $SiN_x$. The plasma mirror is produced by the action of plasma comprising oxygen and/or nitrogen on the silicone at said surface, i.e. the silicone layer defining the interface between the acousto-optic medium and the plasma.

In particular, silica and silicon nitride ($Si_3N_4$) are well-established materials for photonic devices and display a broad transparency window spanning from the visible to the mid-IR. These materials have the qualities required to make plasma effect mirrors. These materials are widely used in the fields of optics and microelectronics and are known for their excellent electrical, mechanical and thermal properties. Both silica and nitride are produced by chemical vapor deposition in a microwave plasma ECR reactor. This method is one of the low temperature deposition technologies and allows the production of high quality dielectric layers without damaging the substrate.

During operation of an acousto-optic modulator disclosed herein, the silicone surface of an acousto-optic element is constantly exposed to oscillating plasma, as will be described in more detail later. This plasma, rich in oxygen and nitrogen, allows the continuous reconstitution of thin surface layers of silicon dioxide ($SiO_2$) and silicon nitride ($Si_3N_4$) which constitute the solid support of a plasma mirror, akin to an autogeneration or self-repair effect.

The ability to form a plasma mirror on the interface between the acousto-optic medium and the overlying volume has the advantage that incident photons are reflected more strongly. In addition, pulses of electromagnetic radiation incident upon the plasma mirror can be focused on another plasma mirror, this time much more strongly and therefore at much higher intensity, up to the relativistic interaction regime, thus leading to an increased treatment effect of a medium to be treated. It is also conceivable that this other plasma mirror is actually part of the same element as the first plasma mirror, for example in the case of a ring-shaped acousto-optic modulator, as will be explained in more detail below. In the relativistic interaction regime, the light field induces an oscillation movement of the plasma mirror surface which induces, by Doppler effect, a periodic temporal distortion of the wave reflected by the mirror. As a result of this periodic distortion, the spectrum of the reflected light is composed, in addition to the incident laser frequency, of a large number of high order harmonics of this frequency. This process, known as the relativistic oscillating mirror process, allows the appearance of sufficiently high harmonic orders to obtain ultra-short pulses.

The combined processes occurring in the heterostructure disclosed herein all contribute to the appearance of single photons and in particular optical pumping in the diamond nanoparticles and luminescence in the optical silicone, respectively.

In a preferred embodiment of the acousto-optic modulator disclosed herein, the total thickness of the laminate consisting of the piezoelectric transducer and the acousto-optic element is between 4 and 80 mm, preferably between 20 and 40 mm.

The object is further achieved by an arrangement of at least one acousto-optic modulator according as disclosed herein and at least one electrode. A space is formed between the surface of said acousto-optic modulator and said electrode in which a medium can be introduced. The electrode comprises at least a partial coating, preferably a complete coating, with Raman scattering crystals, in particular diamond.

Preferably, the arrangement comprises a ring-shaped acousto-optic modulator as described herein and at least one electrode arranged inside said ring-shaped acousto-optic modulator.

It is understood, but not limited therein, that the photons present in such an arrangement of a ring-shaped acousto-optic modulator are reflected and scattered by the surface of the acousto-optic element and at least partially remain confined in the space between said surfaces, i.e. the lumen inside the ring-shaped acousto-optic modulator, which increases the probability of interaction of the photons with the medium to be treated.

Further, wavelength shifting and photonic pulse variation due to various physical phenomena may occur, which leads to a broad range of possible photochemical reactions in the medium to be treated and enhances the efficiency of the treatment further.

In the context of the present specification, the term lumen refers to the volume available for a medium to be treated inside a space at least partially defined or limited by one or more acousto-optic modulators as described herein.

The object is further achieved by a device for the treatment of a medium, in particular air. The device comprises at least one arrangement as disclosed herein and a treatment chamber. The treatment chamber defines a lumen and comprises the at least one arrangement of an acousto-optic modulator and an electrode. The treatment chamber further comprises an inlet in fluid communication with the lumen and comprising a first opening proximal a first end of the treatment chamber and an outlet in fluid communication with the lumen and comprising a second opening proximal a second end of the treatment chamber. A flow pathway exists between the inlet and the outlet going through the lumen.

While not wishing to be limited to a specific theory, it is believed that the nature of the particles and electromagnetic radiation to be confined in the treatment chamber is very diverse, including ions, electrons, microwaves, acoustic waves, Alfvén waves, and/or electromagnetic radiation ranging from infrared (IR) to ultraviolet (UV) light. Confinement and reflection of the plasma in the treatment chamber leads to the formation of a multitude of high-energy short pulsed laser filaments, which are absorbed by the medium or the substances contained therein and effect the treatment of the medium. The ability to return the majority of these particles and waves back to the interior of the treatment chamber likely determines the performance of the system. Hence, it is necessary to prevent leaks in the treatment chamber which would be a source of electromagnetic disturbances and to have walls which are resistant to degradation, in particular resistant to decomposition by UV light.

In particular, the device comprises a ring-shaped acousto-optic modulator with a longitudinal axis which is substantially parallel to the average flow direction of the medium to be treated through the treatment chamber.

Such a device has the advantage that the achieved treatment of the medium is energy-efficient. Such a device may be incorporated into ventilation and/or air conditioning systems but may also be used as a stand-alone device, in particular for the treatment of air.

In a preferred embodiment of the device disclosed herein, the treatment chamber comprises an amplification structure, in particular a perforated amplification structure. The amplification structure is formed conically in the average flow direction of the medium. Preferably, the amplification structure is formed as an epicycloid. The amplification structure comprises at least a partial, preferably a complete diamond coating.

The term perforated as used herein refers to openings in the amplification structure through which air and/or plasma can pass.

The conical shape of the amplification structure has the advantage that the flow of the gaseous medium is directed to the one or more treatment chamber outlets, which increases the plasma density, i.e. the number charged particles in the plasma, downstream of the amplification structure and thus the treatment effect.

In a preferred embodiment of the device disclosed herein, the surface of the acousto-optic element of the ring-shaped acousto-optic modulator is formed as an epicycloid according to the amplification structure.

Such a structure has the advantage that the surface of the acousto-optic modulator and the electromagnetic radiation incident on the surface of the acousto-optic modulator is optimally dispersed, leading to an enhanced treatment effect.

Preferably, a voltage can be applied to the amplification structure in such a way that the amplification structure functions as a counter-electrode to the electrode comprised in the treatment chamber, in particular in such a way that the electrode functions as a cathode and the amplification structure functions as an anode.

In a preferred embodiment of the device disclosed herein, the acousto-optic modulator is arranged on the inner wall of said treatment chamber. In this embodiment, the lumen is flooded with light during the intended operation of the device so as to allow the continuous treatment of said medium flowing through the treatment chamber.

This has the advantage that all medium introduced into the treatment chamber is treated.

In a preferred embodiment, the device disclosed herein is configured for the treatment of a gaseous medium and further comprises means for introducing a liquid into the gas stream to be treated.

Preferably, said liquid is introduced in the form of droplets with a diameter between 8 and 12 micrometers.

Without wishing to be bound by theory, it is presently assumed that the impact of electromagnetic pulses on the surface of the liquid droplets leads to a pressure gradient in the respective droplets, which ultimately leads to the implosion of the droplets and the emission of a shock wave, which in turn accelerates the molecules and/or particles, e.g. electrons, present in the treatment chamber.

By injecting droplets of the specified size range, the effect can be optimized and the treatment of the medium is rendered particularly effective.

The object is further achieved by the use of an acousto-optic modulator as disclosed herein, in particular in a device as disclosed herein, for the treatment of a medium, in particular air.

The object is further achieved by the use of an acousto-optic modulator as disclosed herein, in particular in a device as disclosed herein, for shortening the light pulse duration and/or increasing the energy of photons incident on the acousto-optic medium.

The object is further achieved by the use of an acousto-optic modulator as disclosed herein, in particular in a device as disclosed herein, for the synthesis of organic molecules.

In particular, said organic molecules may be amino acids, which are preferably at least partially synthesized using combustion gases selected from the group consisting of carbon dioxide and nitrous oxides.

The object is further achieved by the use of an acousto-optic modulator as disclosed herein, in particular in a device as disclosed herein, for the production of hydrogen from water, alcohols and/or hydrocarbons.

The invention is further explained in more detail by means of figures, in which like reference numerals are used to refer to the same or similar elements.

Figure 2:
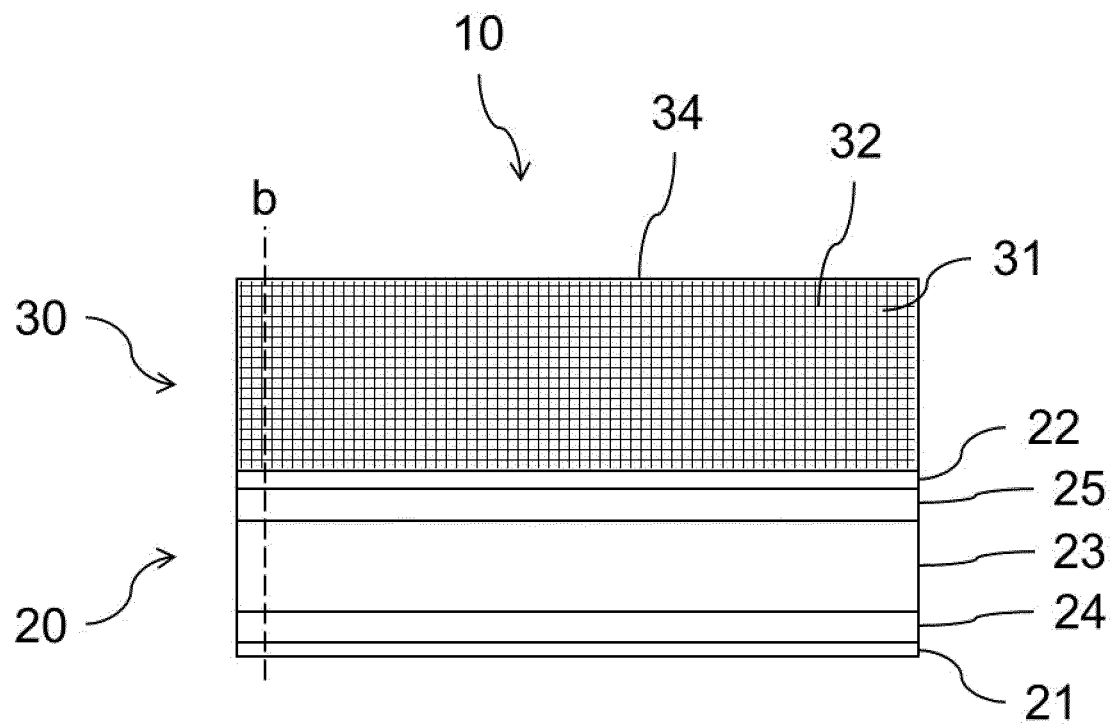
Figure 3:
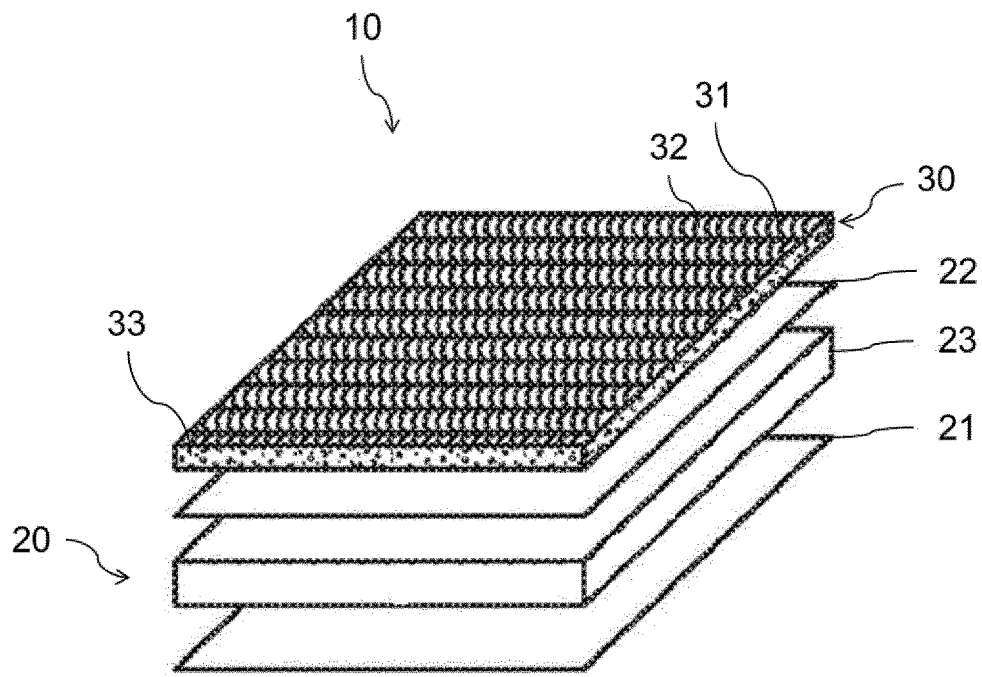
Figure 4:
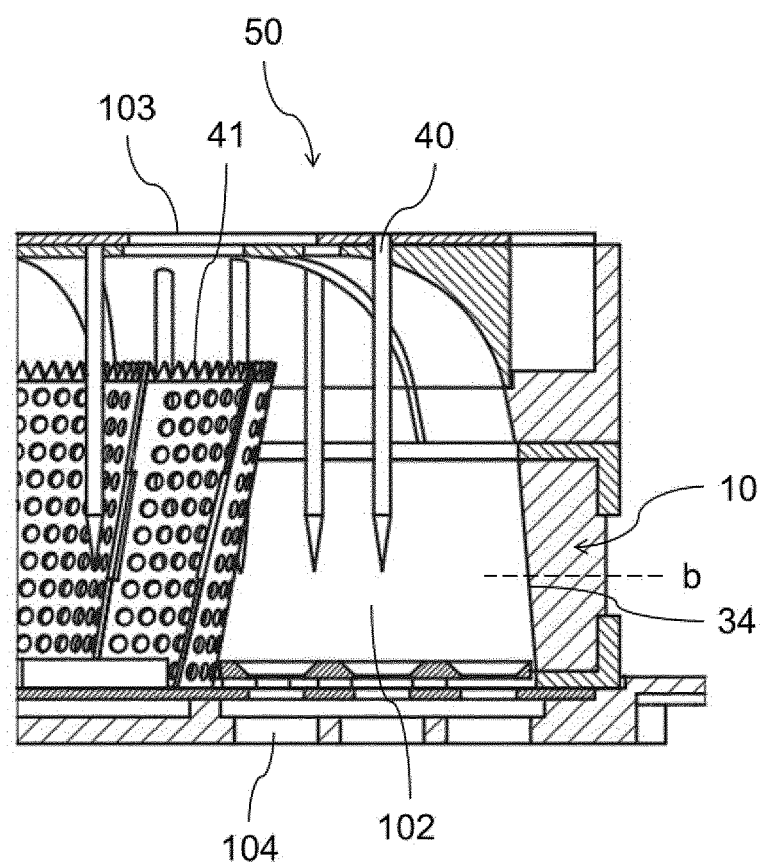
Figure 5:
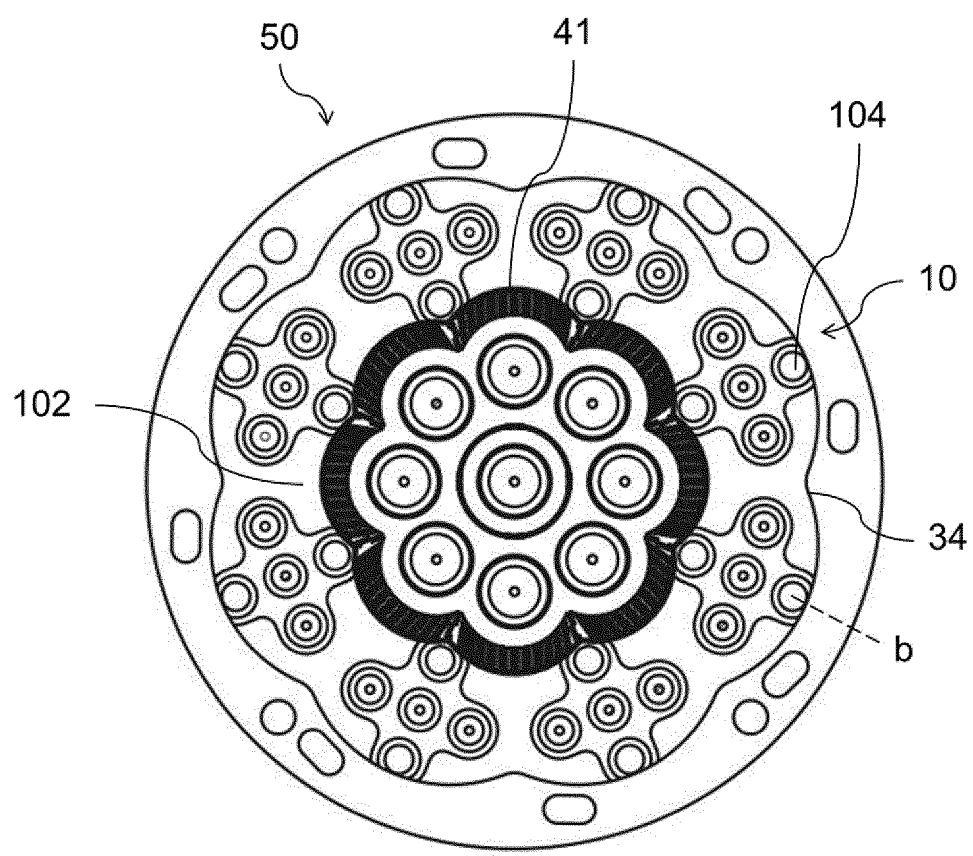
Figure 6:
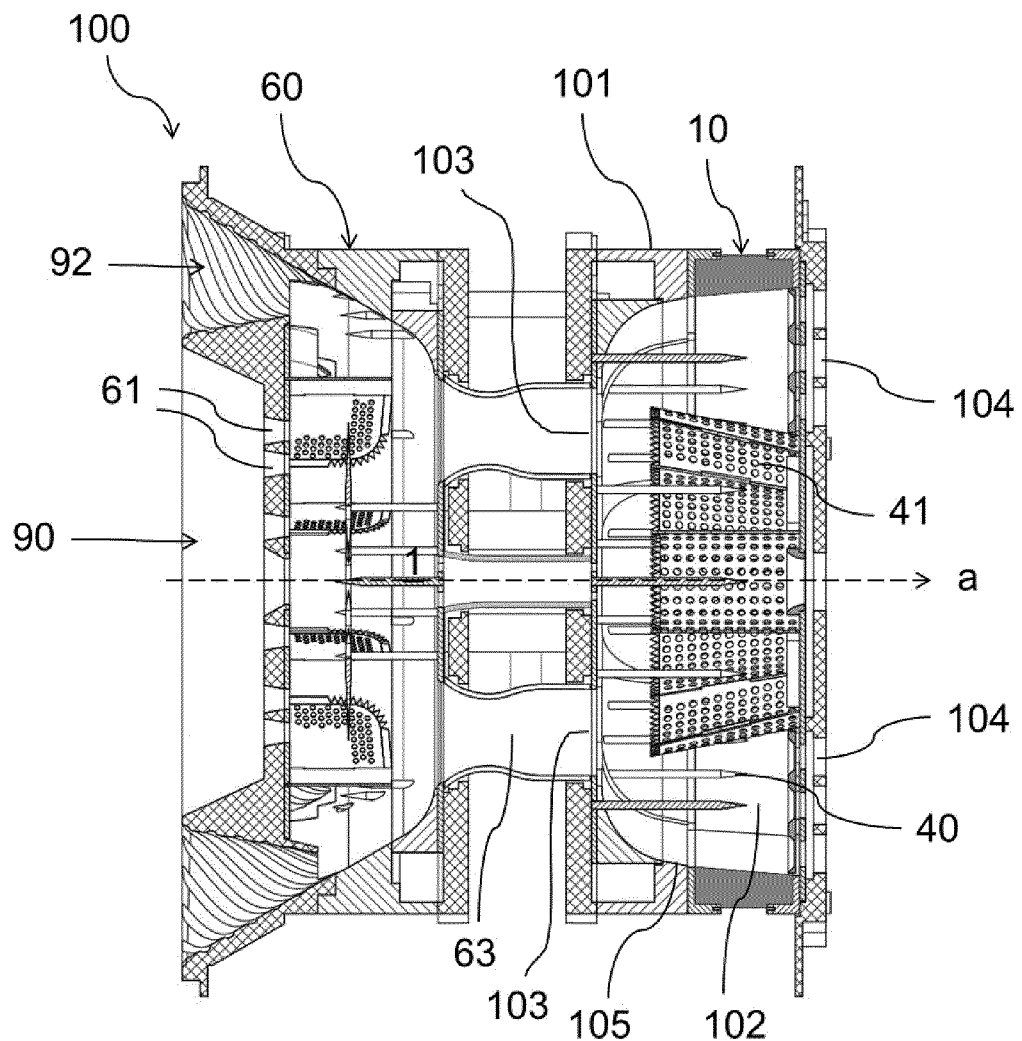

FIG. 1: Perspective illustration of an acousto-optic modulator according to the present invention;

FIG. 2: Layered structure of an acousto-optic modulator along the dashed line b in FIG. 1;

FIG. 3: Layered structure of another acousto-optic modulator along the dashed line b in FIG. 1 in an exploded drawing style;

FIG. 4: Longitudinal section of an arrangement of an acousto-optic modulator and an electrode;

FIG. 5: Cross section of an arrangement of an acousto-optic modulator and an electrode;

FIG. 6: Longitudinal section of a device according to the present invention.

FIG. 1 shows a perspective view of an acousto-optic modulator (10) as disclosed herein. The acousto-optic modulator (20) comprises a piezoelectric transducer (20) and an acousto-optic element (30) forming a laminate. In the present example, the acousto-optic modulator (10) is built into a circular housing so that only the electrode (21) of the piezoelectric transducer (20) facing away from the acousto-optical element (30) and the surface (34) of the acousto-optical element (30) opposite thereto are visible in this representation. A detailed structure of the acousto-optic modulator (10) along the dashed line b is described in more detail in FIGS. 2 and 3 below. Furthermore, the average flow direction of the medium to be treated (90) is indicated by the dashed line a.

FIG. 2 schematically shows the layered structure of an acousto-optic modulator (10) as a cross-section along the dashed line b. Starting from the surface (34) of the acousto-optic element (30) facing the medium to be treated and in the direction of the piezoelectric transducer (20), the sequence of materials in this embodiment of the acousto-optic modulator (10) initially consists of a doubly-periodic structure of a knitted glass fibre fabric (31) and an optical silicone (32), which together form the acousto-optic element (30). The preparation of said acousto-optic element (30) will be described in more detail later. A first electrode (22) is directly connected to the acousto-optic element (30), which electrode consists, for example, of a piece of aluminium foil customary in households with a thickness of about 15 micrometers. The first electrode (22) is connected to a dielectric material (23) via a contact element (25), which for example consists of a glass fiber textile. The dielectric material (23) of the piezoelectric transducer (20) may be a mixture of, for example, carnauba wax, rosin and beeswax. The further sequence of materials in the acousto-optic modulator (10) consists of a further contact element (24) and a second electrode (21), wherein the materials used for these elements (21, 24) may be the same as or different from those of the first electrode (22) and the first contact element (25). The second electrode (21) and the surface (34) of the acousto-optic element (30) are located on opposite sides of the acousto-optic modulator (10), in other words, the second electrode (21) and the surface (24) form the two outermost layers of the laminate.

FIG. 3 shows another embodiment of an acousto-optic modulator (10) in an exploded drawing style from which the layered structure of the acousto-optic modulator (10) can be appreciated even more. In particular, FIG. 3 schematically illustrates acousto-optic element layer (30) which comprises a textile (31) in which the yarns are made from a dielectric material. The yarns form a doubly-periodic structure, wherein the gaps between the yarns are filled with a dielectric material (32), in particular a dielectric resin, featuring a refractive index different from the refractive index of the material used to prepare the textile (31) with the doubly-periodic structure. In the present example, the dielectric resin (32) used to impregnate and fill the textile (31) further comprises Raman-scattering crystals (33) dispersed in the resin. The thus formed acousto-optic element (30) is laminated with a piezoelectric transducer (20) comprising a dielectric material (23) sandwiched between two electrodes (21, 22).

FIG. 4 shows a longitudinal section of an arrangement (50) of an acousto-optic modulator (10) and an electrode (40). In this representation, the average flow direction of the medium to be treated would be substantially in the drawing plane (not shown). In the present example, the arrangement (50) is ring-shaped, i.e. the acousto-optic modulator (10) and the amplifier structure (41) are arranged concentrically with electrodes (40) being disposed between said ring-shaped acousto-optic modulator (10) and said amplifier structure (41). The space (102) between the surface (34) of said acousto-optic modulator (10) and said amplifier structure (41) is where the interaction between the molecules in the medium to be treated and the plasma occurs. The medium (90) to be treated enters the space (102) via treatment chamber inlets (103) and exits the space (102) through treatment chamber outlets (104). The electrodes (40) comprise at least a partial diamond coating in order to enhance the treatment effect as described hereinbefore.

FIG. 5 shows the arrangement (50) of FIG. 4, albeit in a cross sectional view. In the present example, the surface (34) of the acousto-optic modulator (10) facing the treatment space (102) is formed as an epicycloid according to the amplification structure (41). Without wishing to be bound by theory, it is assumed that by forming the side wall of the treatment chamber, i.e. the surface (34) of the acousto-optic modulator (10), parabolically, the acoustic waves can be effectively dispersed and reflected inside the treatment chamber. This way, the treatment effect can be enhanced.

FIG. 6 shows a longitudinal section of a device (100) as disclosed in WO 2012/028687, but with an acousto-optic modulator as disclosed herein. The device (100) for the treatment of a medium (90), in particular air (91), comprises at least one arrangement (50) of an acousto-optic modulator (10) and an electrode (40) in a treatment chamber (101) defining a lumen (102), an inlet (103) in fluid communication with the lumen (102) and a first opening proximal a first end of the treatment chamber (101), an outlet (104) in fluid communication with the lumen (102) and a second opening proximal a second end of the treatment chamber (101). The device further comprises a flow pathway (a) between the inlet (103) and the outlet (104) and through the lumen (102).

Before entering the treatment chamber (101), the gaseous or liquid medium (90) to be treated is conveyed into a plasma-generating device (60) by external means not shown in the schematic drawing. However, conveying means may include one or more ventilators, for example. The plasma-generating device (60) may be a plasma chamber and comprises preferably a generator for the generation of electromagnetic radiation with a frequency in the microwave range.

The medium (90) enters the plasma-generating device (60) through plasma-device inlets (61). Inside the plasma-generating device (60) plasma (1) is generated in the medium (90), i.e. air (91) is converted into plasma (1). It is conceivable that the plasma (1) exhibits atmospheric pressure, i.e. pressure in the range of 0.8 bar to 1.2 bar, and a temperature in the range of 15° C. to 45° C. The plasma (1) is conveyed through plasma-device outlets (62) into dielectric structures (63) which may be formed as a tube of circular, rectangular or elliptic cross-section. In particular, such a structure can be formed with any section. The tube further preferably comprises or is coated with silica. Such fused silica tubes (63) allow for conveying the plasma (1) formed in the plasma-generating device (60) towards the treatment chamber inlets (103) and the treatment chamber (101), respectively. This has the effect of accelerating at least a fraction of the electrons in the plasma (1). The fused silica tubes (63) have a tapering section in flow direction (a) of the medium, which means that the flow cross-section of the tube decreases at least in a section of the tube in flow direction of the medium. This is used to create turbulences in the flow of the medium and in the plasma which contributes to the "mixing" of the plasma (1). Therefore, a synergistic effect may be achieved, sustaining the plasma (1) over a greater length and modify the plasma (1), thereby extending the time the plasma (1) can react with the medium (90). Without wishing to be bound by theory, it is further assumed that at least a fraction of the electrons of the plasma is accelerated to higher velocities by a surface wave in the dielectric structure (63), which also leads to an improved treatment.

In the treatment chamber (101), the acousto-optic modulator (10) is arranged on the inner wall (105) of said treatment chamber (101), wherein the volume (102) existing between the acousto-optic modulator (10), i.e. the lumen (102), comprises a plurality of electrodes (40). The electrodes (40) are preferably coated with a complete diamond coating. A voltage between 4 and 17 kV is applied between the electrodes (40) with a power supply (not shown). Preferably the voltage applied between said electrodes (40) is between 8 and 12 kV. This has the effect of supporting the plasma generation and maintaining the plasma (1) present in the treatment chamber (101). The treatment chamber (101) thus allows for increasing the interaction duration between the plasma (1) and the medium (90), which increases the treatment effect and makes the device (100) more energy efficient.

A further advantage of the treatment chamber (101) disclosed herein is the amplification of the number of photons, i.e. the photon species of the plasma, during the intended operation of the device (100). In other words, the treatment chamber (101) is flooded with plasma (1) which interacts with contaminants such as airborne microbes or chemical toxins and thus reduces the amount of such contaminants in the plasma (1). Hence, the plasma (1) exiting the treatment chamber outlets (104) contains a lower amount of contaminants. In particular, the device (100) as described herein allows the continuous treatment of said medium (90) flowing through the treatment chamber (101). Preferably, the inner wall (105) of the treatment chamber (101) comprises a diamond coating.

In the present example, starting from the treatment chamber inlets (103) and moving in flow direction (a) of the medium (90), the inner wall (105) has a first section with a substantially curved surface and a second section with a flattened surface formed by the lumen-facing surface of the acousto-optic element (34) of the acousto-optic modulator (10). The treatment chamber (101) further comprises an amplification structure (41) in the form of an epicycloid and a cylindrical structure (not shown) arranged in the volume enclosed by the amplification structure (41). The amplification structure (41) and the cylindrical structure each feature a diamond coating.

In a preferred embodiment, the device (100) disclosed herein is configured for the treatment of a gaseous medium (91) and further comprises means for introducing a liquid (92) into the gas stream to be treated (not shown).

In the following, a method for preparing an acousto-optic modulator as disclosed herein is described. The method for preparing the acousto-optic modulator comprises the steps of: i) Providing a mold comprising a first electrode and a second electrode, said electrodes being spaced apart and each defining one wall of said mold; ii) optionally, providing two contact elements, one on each side of the electrodes facing each other; iii) Connecting said electrodes to a voltage source; iv) Providing a first dielectric material in a molten state; v) Filling said mold with the molten first dielectric material; vi) Applying a DC voltage to the two electrodes; vii) Maintaining this voltage during cooling of the first dielectric material, at least until complete solidification of the molten first dielectric material; viii) Providing a textile made of a dielectric material, wherein said textile comprises a doubly-periodic structure; and ix) Impregnating said textile with a dielectric material having a refractive index different from that of the textile dielectric material.

As electrets will attract charged dust particles and various ions in the open air and will rapidly lose their electrization, electrets must be stored tightly shielded, e.g. wrapped in aluminium foil.

Therefore, it is preferred that the dielectric material is covered as much as possible by the electrodes in the piezoelectric transducer and that the contact between the dielectric material and the electrodes is as large as possible.

Preferably, the electret is manufactured in a mold which will later form part of the device comprising the acousto-optic modulator.

By manufacturing the electret, i.e. the first dielectric material after polarization in the electric field, directly in a mold comprising essentially the desired dimensions of the final piezoelectric transducer, the electret does not need to be separated from the electrodes after its manufacture, which allows it to keep its electrization particularly well.

It is also conceivable that the molten first dielectric material is poured into a mold resting on a piece of aluminium foil placed on an insulated metal electrode. A second piece of aluminium foil is placed on top of the mold containing the melt, and a cover electrode is placed onto the foil.

After filling the mold with the melt, a high voltage is applied between the two electrodes and the first dielectric material is allowed to cool for approximately 1 h under the influence of the applied electrical voltage until the first dielectric material is completely solid. The voltage is then turned off, and the electret thus obtained may be removed from the mold, if necessary.

Preferably, the connection of the provided textile having a doubly-periodic structure with the piezoelectric transducer is established in the impregnation step.

For example, it is conceivable to place a glass fiber knit, which has essentially the same dimensions as the contact surface of the piezoelectric transducer to be covered by the acousto-optic element, on said contact surface and to impregnate said glass fiber knit with optical silicone before and/or after.

If necessary, the glass fiber knit can also be fixed to a portion of the contact surface or over the entire contact surface of the piezoelectric transducer prior to the impregnation step, for example with an assembly silicone.

This has the advantage that the textile can be quickly and safely fixed in the desired shape, for example, if the shape of the piezoelectric transducer is not flat, if the acousto-optic modulator is manufactured at different stations between which semi-finished products have to be transported, or if the geometry of the acousto-optic modulator requires the textile to be held against gravity. In this case, the actual impregnation of the glass fiber knit with the further dielectric material, e.g. an optical silicone, is performed at a later stage.

In a preferred embodiment, Raman-scattering crystals, e.g. diamond nanoparticles, are added to the dielectric material used to impregnate the textile. In this case, it is advisable to incorporate these particles into the dielectric material, e.g. an optical silicone, before the impregnation step in order to achieve a homogeneous colloidal dispersion of said Raman-scattering crystals in said dielectric material.

Depending on the dielectric material used for the impregnation of the textile, it is preferable to crosslink the dielectric material in order to achieve higher mechanical strength of the acousto-optic element and/or an improved adhesion between the dielectric material and the textile. The crosslinking can be effected, for example, by ultraviolet radiation, in which case the dielectric material resin used for impregnation preferably comprises a photoinitiator and/or the textile is treated with a photoinitiator-containing compound prior to impregnation.

The invention claimed is:

1. An acousto-optic modulator for a device for the treatment of a medium, the acousto-optic modulator comprising:
   a piezoelectric transducer with a first electrode, a second electrode, and a dielectric material disposed between and in contact with said electrodes; and
   an acousto-optic element comprising at least two further dielectric materials with mutually different refractive indices;
   wherein said piezoelectric transducer and said acousto-optic element are laminated together, wherein at least one of said further dielectric materials of said acousto-optic element is a dielectric textile having a doubly-periodic structure.

2. The acousto-optic modulator according to claim 1, wherein at least one of the first and the second electrode material is selected from the group consisting of: metal, activated carbon, graphene, and ionic polymers.

3. The acousto-optic modulator according to claim 1, wherein at least one of the first and the second electrode comprises aluminum foil with a thickness between 4 and 100 μm.

4. The acousto-optic modulator according to claim 1, wherein said dielectric material of the piezoelectric transducer comprises at least one natural wax selected from the group consisting of carnauba, rosin, sugar cane, glycerol ester of wood rosin, lanolin, shellac, tallow, montan, ozocerite, spermaceti, beeswax, ouricury, Japan, bayberry, candelilla, Chinese, Chinese insect, and combinations thereof.

5. The acousto-optic modulator according to claim 1, wherein said dielectric material of the piezoelectric transducer is selected from the group consisting of ZnO, $LiNb_3$, $LiTaO_3$, $SiO_2$, quartz, $TiO_2$, Si, SiN, AlN, GaN, and $SrTiO_3$.

6. The acousto-optic modulator according to claim 1, wherein at least one of said contact elements comprises a dielectric textile.

7. The acousto-optic modulator according to claim 1, wherein said acousto-optic element comprises a glass-fiber knit impregnated with a silicone resin.

8. The acousto-optic modulator according to claim 7, wherein said silicone resin comprises at least one type of Raman-scattering crystals.

9. The acousto-optic modulator according to claim 8, wherein the at least one type of Raman-scattering crystals is selected from the group consisting of diamond, corundum, quartz, or any combination thereof.

10. The acousto-optic modulator according to claim 8, wherein at least one of the content of said Raman-scattering crystals in the silicone is between 0.1 and 2 percent by weight, and the size of said Raman-scattering crystals is between 4 and 1000 nm.

11. The acousto-optic modulator according to claim 7, wherein the surface of said acousto-optic element is configured to form a plasma mirror comprising at least one of $SiO_2$ and SiNx by the action of a plasma comprising at least one of oxygen and nitrogen on the silicone at said surface.

12. The acousto-optic modulator according to claim 1, wherein the total thickness of the laminate consisting of the piezoelectric transducer and the acousto-optic element is between 4 and 80 mm.

13. An arrangement of at least one acousto-optic modulator according to claim 1 and at least one electrode, wherein a space is formed between the surface of said acousto-optic modulator and said electrode in which a medium can be introduced, wherein said electrode comprises at least a partial coating with Raman scattering crystals.

14. A device for the treatment of a medium, the device comprising at least one arrangement according to claim 13, wherein the device further comprises: a treatment chamber defining a lumen; an inlet in fluid communication with the lumen and comprising a first opening proximal a first end of the treatment chamber; an outlet in fluid communication with the lumen and comprising a second opening proximal a second end of the treatment chamber; and a flow pathway between the inlet and the outlet and through the lumen.

15. The device according to claim 14, wherein said acousto-optic modulator is arranged on the inner wall of said treatment chamber, wherein the lumen is flooded with light during the intended operation of the device so as to allow the continuous treatment of said medium flowing through the treatment chamber.

16. The device according to claim 14, wherein the device is configured for the treatment of a gaseous medium and that the device further comprises means for introducing a liquid into the gas stream to be treated.

17. The device according to claim 16, wherein said liquid is introduced in the form of droplets with a diameter between 8 and 12 micrometers.

18. A method for the treatment of a medium, comprising conveying the medium through an acousto-optic modulator according to claim 1.

19. A method for the synthesis of organic molecules, comprising a step of providing combustion gases selected from the group consisting of carbon dioxide and nitrous oxides to the lumen of an acousto-optic modulator according to claim 1.

20. A method for the production of hydrogen from water, comprising a step of providing water to the lumen of an acousto-optic modulator according to claim 1.

21. A method for the production of alcohols, comprising a step of providing at least one alcohol precursor to an acousto-optic modulator according to claim 1.

22. A method for the production of hydrocarbons, comprising a step of providing at least one hydrocarbon precursor to an acousto-optic modulator according to claim 1.

23. The method of claim 18 wherein the method comprises conveying the medium in a device including the acoustic-optic modulator wherein a space is formed between the surface of said acousto-optic modulator and said electrode in which a medium can be introduced, wherein said electrode comprises at least a partial coating with Raman scattering crystals and wherein the device further comprises: a treatment chamber defining a lumen; an inlet in fluid communication with the lumen and comprising a first opening proximal a first end of the treatment chamber; an outlet in fluid communication with the lumen and comprising a second opening proximal a second end of the treatment chamber; and a flow pathway between the inlet and the outlet and through the lumen.

24. The method of claim 19 wherein the method comprises providing the combustion gases in a device including the acoustic-optic modulator, wherein a space is formed between the surface of said acousto-optic modulator and said electrode in which a medium can be introduced, wherein said electrode comprises at least a partial coating with Raman scattering crystals and wherein the device further comprises: a treatment chamber defining a lumen; an inlet in fluid communication with the lumen and comprising a first opening proximal a first end of the treatment chamber; an outlet in fluid communication with the lumen and comprising a second opening proximal a second end of the treatment chamber; and a flow pathway between the inlet and the outlet and through the lumen.

25. The method of claim 20 wherein the method comprises providing the water in a device including the acoustic-optic modulator, wherein a space is formed between the surface of said acousto-optic modulator and said electrode in which a medium can be introduced, wherein said electrode comprises at least a partial coating, with Raman scattering crystals and wherein the device further comprises: a treatment chamber defining a lumen; an inlet in fluid communication with the lumen and comprising a first opening proximal a first end of the treatment chamber; an outlet in fluid communication with the lumen and comprising a second opening proximal a second end of the treatment chamber; and a flow pathway between the inlet and the outlet and through the lumen.

26. The method of claim 21 wherein the method comprises providing the at least one alcohol in a device including the acoustic-optic modulator, wherein a space is formed between the surface of said acousto-optic modulator and said electrode in which a medium can be introduced, wherein said electrode comprises at least a partial coating, with Raman scattering crystals and wherein the device further comprises: a treatment chamber defining a lumen; an inlet in fluid communication with the lumen and comprising a first opening proximal a first end of the treatment chamber; an outlet in fluid communication with the lumen and comprising a second opening proximal a second end of the treatment chamber; and a flow pathway between the inlet and the outlet and through the lumen.

27. The method of claim 22 wherein the method comprises providing the at least one hydrocarbon precursor in a device including the acoustic-optic modulator, wherein a space is formed between the surface of said acousto-optic modulator and said electrode in which a medium can be introduced, wherein said electrode comprises at least a partial coating, with Raman scattering crystals and wherein the device further comprises: a treatment chamber defining a lumen; an inlet in fluid communication with the lumen and comprising a first opening proximal a first end of the treatment chamber; an outlet in fluid communication with the lumen and comprising a second opening proximal a second end of the treatment chamber; and a flow pathway between the inlet and the outlet and through the lumen.

* * * * *